(12) United States Patent
Kim et al.

(10) Patent No.: US 9,383,771 B2
(45) Date of Patent: Jul. 5, 2016

(54) DOCKING STATION FOR ELECTRONIC DEVICE

(71) Applicant: Samsung Electronics Co., Ltd, Suwon-si, Gyeonggi-do (KR)

(72) Inventors: Tae-young Kim, Yongin-si (KR); Yun-pil Yeom, Yongin-si (KR); Jin-gyu Choi, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 95 days.

(21) Appl. No.: 13/915,906

(22) Filed: Jun. 12, 2013

(65) Prior Publication Data

US 2014/0153162 A1 Jun. 5, 2014

(30) Foreign Application Priority Data

Dec. 4, 2012 (KR) ........................ 10-2012-0139710

(51) Int. Cl.
*G06F 1/16* (2006.01)
*H05K 5/00* (2006.01)
*H05K 7/00* (2006.01)

(52) U.S. Cl.
CPC ............ *G06F 1/1632* (2013.01); *G06F 1/1616* (2013.01)

(58) Field of Classification Search
CPC .............................. G06F 1/1632; G06F 1/1616
USPC .............. 361/679.41, 679.42, 679.43, 679.44
See application file for complete search history.

(56) References Cited

U.S. PATENT DOCUMENTS

| 6,072,695 A * | 6/2000 | Steiger ................. H05K 7/1427 361/679.41 |
| 2005/0128687 A1* | 6/2005 | Liang et al. .................... 361/679 |

FOREIGN PATENT DOCUMENTS

JP 2000039933 2/2000

* cited by examiner

*Primary Examiner* — Hoa C Nguyen
*Assistant Examiner* — Binh Tran
(74) *Attorney, Agent, or Firm* — Staas & Halsey LLP

(57) ABSTRACT

A docking station for an electronic device includes a station body to which the electronic device is detachably docked, at least one locking unit comprising a hook member to move between a first position in which the station body and the electronic device are connected and a second position in which the station body is separated from the electronic device, and a lock maintaining unit to maintain the hook member in the first position.

19 Claims, 13 Drawing Sheets

DOCKING STATION FOR ELECTRONIC DEVICE

CROSS-REFERENCE TO RELATED APPLICATIONS

This application claims the benefit of priority under 35 U.S.C. §119(a) from Korean Patent Application No. 2012-0139710 filed Dec. 4, 2012 in the Korean Intellectual Property Office, the disclosure of which is incorporated herein by reference in its entirety.

BACKGROUND OF THE INVENTION

1. Field of the Invention

The present disclosure relates to a docking station for an electronic device.

2. Description of the Related Art

Generally, electronic devices such as laptop computers do not have interfaces such as a local printer, a backup drive, a mass storage apparatus, etc., for easy portability, unlike desktop computers.

A docking station for an electronic device may be used to make up for shortcomings of the electronic devices such as laptop computers, and refers to hardware apparatuses or a series of connection interfaces that can allow the laptop computers to be used like desktop computers.

A laptop computer may be detachably docked to a docking station for an electronic device. After being mounted, the laptop computer is electrically connected to the docking station for an electronic device. Through the docking station a user can easily use an expansion slot, an external storage apparatus, a local printer, etc., via the laptop computer at office or at home like the desktop computer. Also, when the user wants to carry the laptop computer, the user separates and uses the laptop computer from the docking station.

In a conventional docking station, the laptop computer is fixed to the docking station through a hook member. However, there is a problem that the laptop computer is easily removed from the hook member only by a small external force, thereby being separated from the conventional docking station. As a result, the conventional docking station is vulnerable to unexpected accidents, such as theft of the laptop computer mounted to the docking station, etc.

SUMMARY OF THE INVENTION

The present disclosure has been developed in order to overcome the above drawbacks and other problems associated with the conventional arrangement. An aspect of the present disclosure is to provide a docking station for an electronic device that can prevent electronic device theft.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a docking station for an electronic device, which may include a station body to which the electronic device is detachably docked, at least one locking unit comprising a hook member to move between a first position in which the station body and the electronic device are connected and a second position in which the station body may be separated from the electronic device, and a lock maintaining unit to maintain the hook member in the first position.

The lock maintaining unit may include at least one stopper to move between a stop position to restrict movement of the hook member placed in the first position and a stop release position to allow the hook member to be unlocked.

The lock maintaining unit may include a stopper guide link unit to guide the stopper to the stop position or to the stop release position, and a stopper operation unit to drive the stopper guide link unit depending on user operation.

The stopper guide link unit may include a first link member to move in a forward direction or in a reverse direction depending on operation of the stopper operation unit, a second link member that moves in a first direction to guide the stopper to the stop position when the first link member moves in the forward direction, and moves in a second direction opposite to the first direction to guide the stopper to the stop release position when the first link member moves in the reverse direction, and a third link member to transmit a driving force of the first link member to the second link member.

The third link member may transmit the driving force of the first link member to the second link member when the first link member moves in the forward direction, and the lock maintaining unit may include an elastic member that is connected to the second link member, and may provide an elastic force to the second link member in the second direction when the first link member moves in the reverse direction.

The third link member may include one end link-connected to the second link member and another end to movably contact with the first link member.

The third link member may be mounted to the station body through a pivot pin, and can rotate around the pivot pin.

The third link member may include a rotation guide hole to guide rotation of the third link member, and the second link member may include a connection pin to be inserted in the rotation guide hole.

Each of the first link member and the second link member may include at least one sliding guide hole, and the station body may include at least one sliding guide pin to be inserted in the at least one sliding guide hole.

The second link member may include at least one sliding limiting protrusion, and the station body may include at least one catch projection to be in contact with the sliding limiting protrusion when the second link member moves in the second direction.

The second link member may include at least one rear end receiving groove to receive a rear end of the hook member when the hook member is placed in the second position.

The stopper operation unit may include an operation cam for the user operation, and the stopper guide link unit may be driven through rotation of the operation cam.

The stopper may be formed integrally with the second link member.

The stopper may be formed to project from the second link member in a height direction of the station body.

The elastic member may be a coil spring, and the coil spring may include one end to be connected to the second link member and the other end to be fixed to the station body.

The docking station for an electronic device may include an unlocking unit to move the hook member to the second position.

The unlocking unit may include an unlocking guide link to move in the first direction or in the second direction, and an unlocking operation unit to drive the unlocking guide link depending on the user operation, and, when the unlocking guide link is moved in the first direction, the hook member is moved to the second position, and, when the unlocking guide link is moved in the second direction, the hook member is moved to the first position.

The unlocking guide link may be in contact with a front end of the hook member, when being moved in the first direction, the unlocking guide link may move the front end of the hook member in the forward direction, and, when being moved in the second direction, the unlocking guide link may move the front end of the hook in the reverse direction.

The unlocking guide link may include at least one front end receiving groove to receive the front end of the hook member when the hook member is placed in the first position.

The unlocking guide link may include at least one sliding guide hole, and the station body may include at least one sliding guide pin to be inserted in the at least one sliding guide hole.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
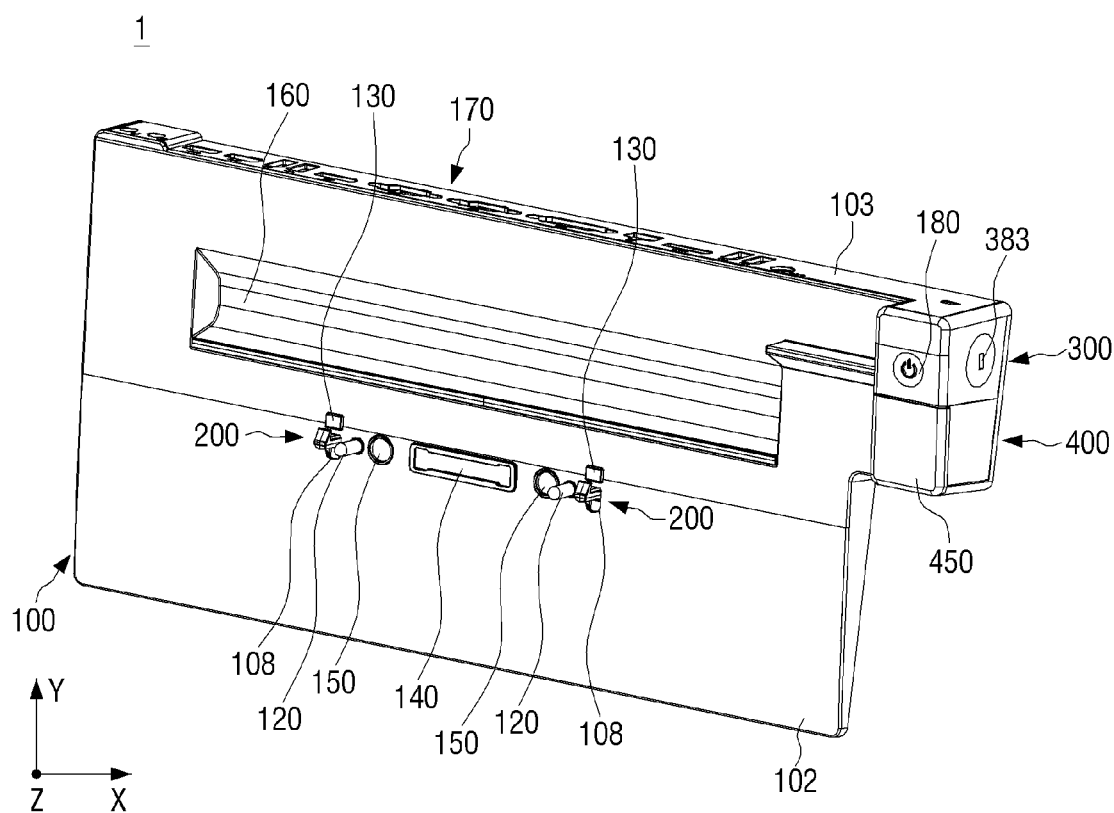
FIG. 1 is a perspective view illustrating a docking station for an electronic device according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

FIG. 1 is a perspective view illustrating a docking station for an electronic device according to an embodiment of the present disclosure.

Referring to FIG. 1, the docking station 1 includes a station body 100, a locking unit 200, a lock maintaining unit 300, and an unlocking unit 400.

The docking station 1 may expand functions of an electronic device 10 (see FIG. 3), and is electrically connected to the electronic device 10 (see FIG. 3), thereby providing the electronic device 10 (see FIG. 3) with additional interfaces that can be connected to an external storage apparatus, a local printer, etc.

The electronic device 10 (see FIG. 3) is docked to a top surface 102 of the station body 100. The station body 100 contains a driving unit (not illustrated) to drive the docking station 1, a control unit (not illustrated) to control operation of the docking station 1, and a variety of parts (not illustrated) configuring the docking station 1 in the inside thereof.

Then, the station body 100 includes at least one guide projection 120, at least one pushing projection 130, a main slot 140, at least one sub-contact portion 150, a receiving groove 160, at least one expansion port 170, and a power button 180.

The guide projection 120 is to guide docking between the electronic device 10 (see FIG. 3) and the docking station 1, and is formed to project from the top surface 102 of the station body 100. The guide projection 120 is inserted into a guide projection inserting hole (not illustrated) provided in the electronic device 10 (see FIG. 3), and thus guides the electronic device 10 (see FIG. 3) to be smoothly docked. Two guide projections 120 are provided in the station body 100, and are spaced apart along the lengthwise direction (X direction) of the station body 100.

The pushing projection 130 is to guide the electronic device 10 (see FIG. 3) to be easily separated from the docking station 1, and projects from the top surface 102 of the station body 100. When the electronic device 10 (see FIG. 3) is separated from the docking station 1, the pushing projection 130 pushes up the electronic device 10 (see FIG. 3) from the top surface 102 of the station body 100, thereby allowing the electronic device 10 (see FIG. 3) to be easily separated from the station body 100. Multiple pushing projections 130 may be provided. For example, two pushing projections 130 are illustrated in FIG. 1. Each of the pushing projections 130 are arranged above the locking unit 200.

The main slot 140 is provided on the top surface 102 of the station body 100, and is connected to a main slot connection unit (not illustrated) of the electronic device 10 (see FIG. 3), thereby electrically connecting the electronic device 10 (see FIG. 3) and the docking station 1.

The sub-contact portion 150 is provided on the top surface 102 of the station body 100, and is connected to a sub-contact (not illustrated) of the electronic device 10 (see FIG. 3), thereby assisting electrical connection between the electronic device 10 (see FIG. 3) and the docking station 1. Two sub-contact portions 150 may be provided. The main slot 140 may be arranged between the two sub-contact portions 150.

The receiving groove 160 is formed in the top surface 102 along the lengthwise direction (X direction) of the station body 100. If a large capacity battery, etc. is mounted on the electronic device 10 (see FIG. 3), a portion on which the battery, etc., is mounted may project. Accordingly, when the electronic device 10 (see FIG. 3) is docked to the docking station 1, the receiving groove 160 may receive the projecting portion of the electronic device 10 (see FIG. 3).

A plurality of expansion ports 170 is provided on a side surface 103 of the station body 100. The docking station 1 may provide the electronic device 10 (FIG. 3) with interfaces that are connected to an external storage apparatus, a local printer, etc. through the plurality of expansion ports 170.

Figure 3:
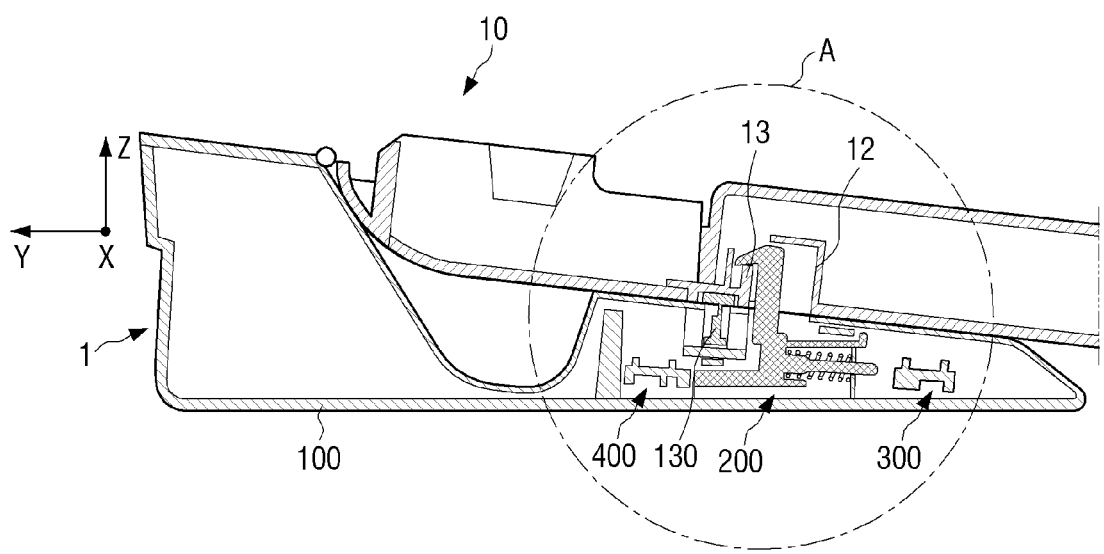
FIG. 3 is a sectional view illustrating a state in which an electronic device is docked to the docking station of FIG. 1.

The power button 180 is provided on the top surface 102 of the station body 100, and turns on or off the power of the electronic device 10 (see FIG. 3). After the electronic device 10 (see FIG. 3) is docked to the docking station 1, the power of the electronic device 10 (see FIG. 3) may be turned on or off through the power button 180.

The locking unit 200 projects through a hook through hole 108 of the top surface 102 of the station body 100. The locking unit 200 is to lock the electronic device 10 (see FIG. 3). The locking unit 200 can slide in a forward and reverse direction (Y direction) relative to the station body 100, and may be connected to the electronic device 10 (see FIG. 3) by a hook. One or more locking units 200 may be provided. For example, two are illustrated in FIG. 1, and each of the locking units 200 is arranged below the pushing projection 130.

The lock maintaining unit 300 is to maintain the locking unit 200 in a first position, and prevents the electronic device 10 (see FIG. 3) from being separated from the docking station 1. Here, the first position refers to a locking position in which a hook member 210 (see FIG. 2) is connected to the electronic device 10 (see FIG. 3) docked with the station body 100. The lock maintaining unit 300 is driven by user operation. The lock maintaining unit 300 has a key hole 383 into which a locking key is inserted for the user operation. However, this is only one example, therefore the lock maintaining unit 300 may have various different ways to enable user operation such as a button, etc.

The unlocking unit 400 releases the locking of the locking unit 200, and facilitates the separation of the electronic device 10 (FIG. 3) from the docking station 1. The unlocking unit 400 is also driven by the user operation. Accordingly, the unlocking unit 400 has an unlocking operation unit 450 for the user operation. The unlocking operation unit 450 is disposed below the power button 180, and is driven by a button. However, this is only one example; therefore the unlocking unit 400 may have various different ways to enable the user operation.

Figure 2:
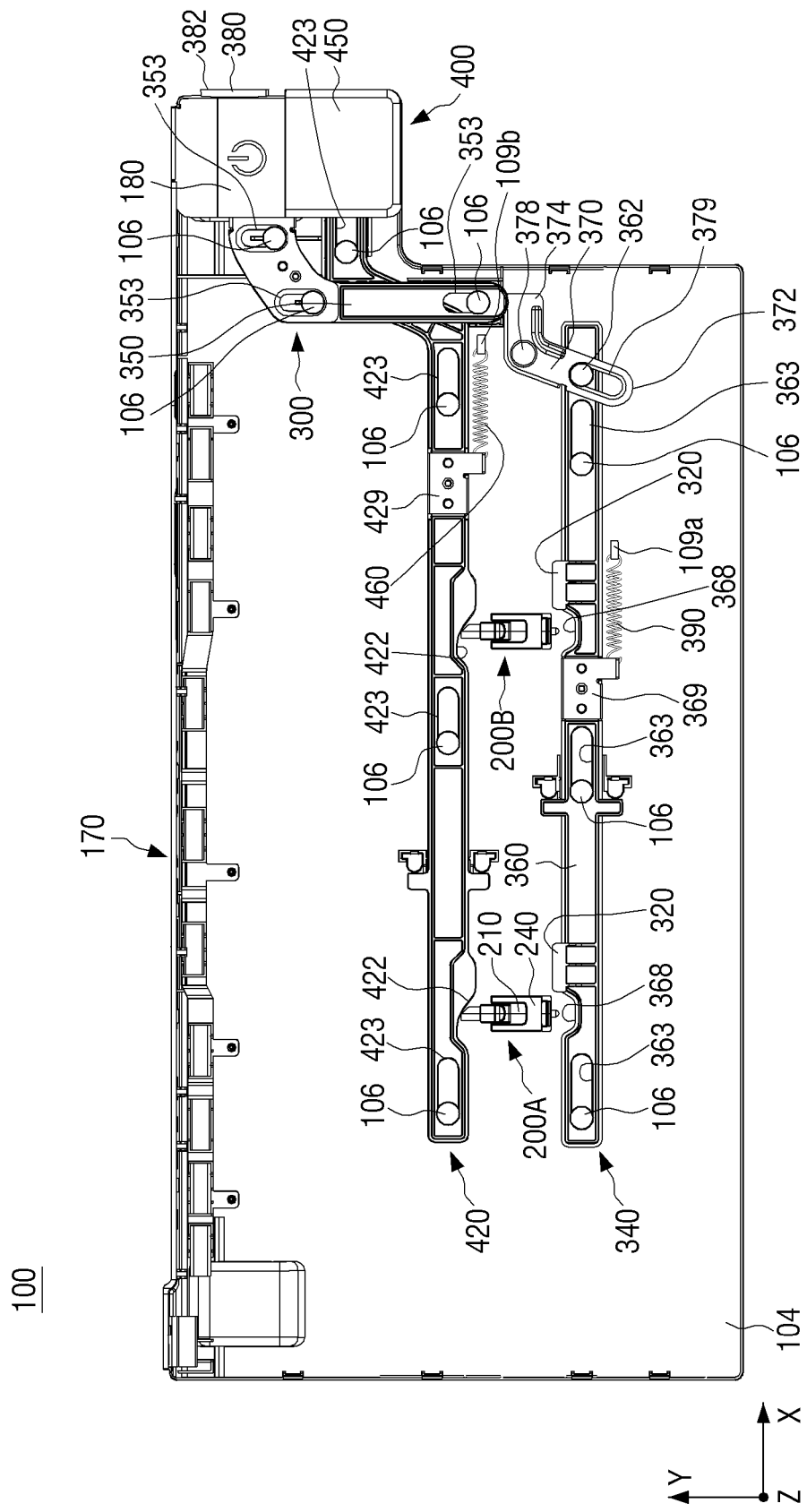
FIG. 2 is a plan view illustrating an inner surface of the docking station of FIG. 1.

FIG. 2 is a plan view schematically illustrating an inner surface of the docking station 1 of FIG. 1.

Referring to FIG. 2, each of the locking units 200A and 200B includes a hook member 210 and a locking unit mounting portion 240.

The hook member 210 projects from the top surface 102 (see FIG. 1) of the station body 100, and thus may hook onto the electronic device 10 (see FIG. 3). The hook member 210 can slide in the forward and reverse direction (Y direction) of the station body 100, and the electronic device 10 (see FIG. 3) can be detachably docked with the docking station 1 (see FIG. 1) via the hook member 210.

The locking unit mounting portion 240 is disposed in an inner surface 104 of the station body 100, and receives the hook member 210. The locking unit mounting portion 240 may be disposed in the inner surface 104 of the station body 100 as a separate member or may be formed integrally with the inner surface 104 of the station body 100.

The lock maintaining unit 300 includes a stopper 320, a stopper guide link unit 340, a stopper operation unit 380, and an elastic member 390.

The stopper 320 is formed to slide between the stop position (see FIG. 9) to limit movement of the hook member 210 placed at a locking position "l" (see FIG. 4) and the stop release position (see FIG. 8) to allow unlocking of the hook member 210. The stopper 320 is provided to correspond to the number of the locking units 200A and 200B. In the present embodiment, two stoppers 320 are provided.

The stopper guide link unit 340 guides the stopper 320 to the stop position (see FIG. 9) or to the stop release position (see FIG. 8), and is disposed in the inner surface 104 of the station body 100.

The stopper guide link unit 340 includes a first link member 350, a second link member 360, and a third link member 370.

The first link member 350 is arranged along the forward and reverse direction (Y direction) of the station body 100. The first link member 350 is connected to the stopper operation unit 380, and is disposed in the inner surface 104 of the station body 100 to slide in a forward direction (−Y direction) or in a reverse direction (+Y direction) depending on the operation of the stopper operation unit 380.

A plurality of sliding guide holes 353 is formed in the first link member 350. Each of the sliding guide holes 353 is formed along the forward and reverse direction (Y direction) of the station body 100. A sliding guide pin 106 disposed on the inner surface 104 of the station body 100 is inserted into each of the sliding guide holes 353.

The second link member 360 is arranged along the lengthwise direction (X direction) of the station body 100. The second link member 360 is disposed on the inner surface 104 of the station body 100 so that, when the first link member 350 slides in the forward direction (−Y direction), the second link member 360 slides in the first direction (−X direction) to guide the stopper 320 to the stop position (see FIG. 8), and, when the first link member 350 slides in the reverse direction (+Y direction), the second link member 360 slides in the second direction (+X direction) opposite to the first direction (−X direction) to guide the stopper 320 to the stop release position (see FIG. 9).

A plurality of sliding guide holes 363 is formed in the second link member 360. Each of the sliding guide holes 363 is formed along the lengthwise direction (X direction) of the station body 100. A sliding guide pin 106 disposed on the inner surface 104 of the station body 100 is inserted into each of the sliding guide holes 363.

Two stoppers 320 are formed in the second link member 360. Each of the stoppers 320 is formed to project in a height direction (Z direction) of the station body 100 from the second link member 360. Each of the stoppers 320 may be formed integrally with the second link member 360. However, this is only one example; therefore, the stoppers 320 may be disposed on the second link member 360 as separate members.

At least one rear end receiving groove 368 to receive a rear end 216 (see FIG. 4) of the hook member 210 when the hook member 210 is positioned in a second position "u" (see FIG. 4) is formed in the second link member 360. Here, the second position "u" (see FIG. 4) refers to an unlocking position in which the station body 100 may be separated from the electronic device 10 (see FIG. 3). The rear end receiving groove 368 is formed to correspond to the number of the hook member 210. In the present embodiment, two rear end receiving grooves 368 are formed. Each of the rear end receiving grooves 368 is disposed next to the stopper 320.

An elastic member mounting unit 369 to mount the elastic member 390 is provided with the second link member 360. The elastic member mounting unit 369 is disposed in the second link member 360 as a separate member. However, this is only one example; therefore, the elastic member mounting unit may be formed integrally with the second link member.

The third link member 370 transmits a driving force of the first link member 350 to the second link member 360 when the first link member 350 slides in the forward direction (−Y direction). Also, the third link member 370 transmits a driving force of the second link member 360 to the first link member 350 when the second link member 360 slides in the second direction (+X direction).

One end 372 of the third link member 370 is link-connected to the second link member 360, and the other end 374 thereof is slidably in contact with the first link member 350. A rotation guide hole 379 to guide the rotation of the third link member 370 is formed in the third link member 370. A connection pin 362 disposed in the second link member 360 is inserted in the rotation guide hole 379. Then, the third link member 370 is mounted to a pivot pin 378 fixed to the inner surface 104 of the station body 100. The third link member 370 is mounted to rotate about the pivot pin 378.

The stopper operation unit 380 drives the stopper guide link unit 340 depending on the user operation. One surface 382 of the stopper operation unit 380 is exposed to the outside of the station body 100. The key hole 383 (see FIG. 1) is formed on the exposed surface 382 of the stopper operation unit 380. An operation cam (not illustrated) for the user operation is formed in the stopper operation unit 380, and the stopper guide link unit 340 is driven through the rotation of the operation cam (not illustrated).

The elastic member 390 is disposed in the elastic member mounting unit 369 to be connected with the second link member 360, and thus, when the first link member 350 slides in the reverse direction (+Y direction), provides the second link member 360 with an elastic force in the second direction (+X direction).

The unlocking unit 400 includes an unlocking guide link 420, an unlocking operation unit 450, and an unlocking elastic member 460.

The unlocking guide link 420 is disposed along the lengthwise direction (X direction) of the station body 100 to slide in the first direction (−X direction) or in the second direction (+X direction). The unlocking guide link 420 slides in the first direction (−X direction) when moving the hook member 210 to the unlocking position "u" (see FIG. 4), and slides in the second direction (+X direction) when allowing the hook member 210 to move to the locking position "l" (see FIG. 4).

At least one front end receiving groove 422 to receive a front end 214 (see FIG. 4) of the hook member 210 when the hook member 210 is positioned in the locking position "l" (see FIG. 4) is formed in the unlocking guide link 420. The front end receiving groove 422 is provided to correspond to the number of the hook member 210. In the present embodiment, two front end receiving grooves 422 are provided.

A plurality of sliding guide holes 423 is formed in the unlocking guide link 420. Each of the sliding guide holes 423 is formed along the lengthwise direction (X direction) of the station body 100. The sliding guide pin 106 disposed on the inner surface 104 of the station body 100 is inserted in each of the sliding guide holes 423.

The unlocking guide link 420 is provided with an unlocking elastic member mounting unit 429 to mount the unlocking elastic member 460. The unlocking elastic member mounting unit 429 is disposed in the unlocking guide link 420 as a separate member. However, this is only one example; therefore, the unlocking elastic member mounting unit may be formed integrally with the unlocking guide link.

The unlocking operation unit 450 drives the unlocking guide link 420 depending on the user operation. An unlocking operation cam (not illustrated) for the user operation is formed in the unlocking operation unit 450, and thus the unlocking guide link 420 is driven through the rotation of the unlocking operation cam (not illustrated). The unlocking operation unit 450 is operated by a button as described above with reference to FIG. 1.

The unlocking elastic member 460 is mounted to the unlocking elastic member mounting unit 429 to be connected with the unlocking guide link 420, and thus provides the unlocking guide link 420 with an elastic force in the second direction (+X direction).

Figure 4:
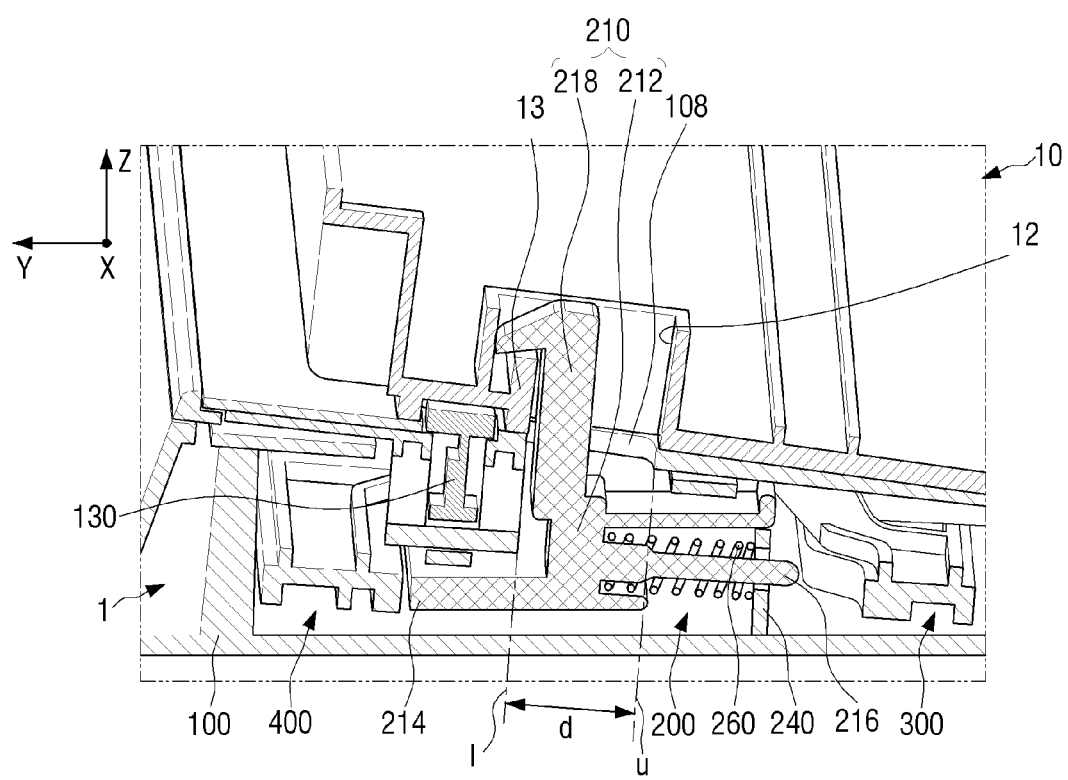
FIG. 4 is an expanded sectional view illustrating a part of "A" in FIG. 3.
Figure 5:
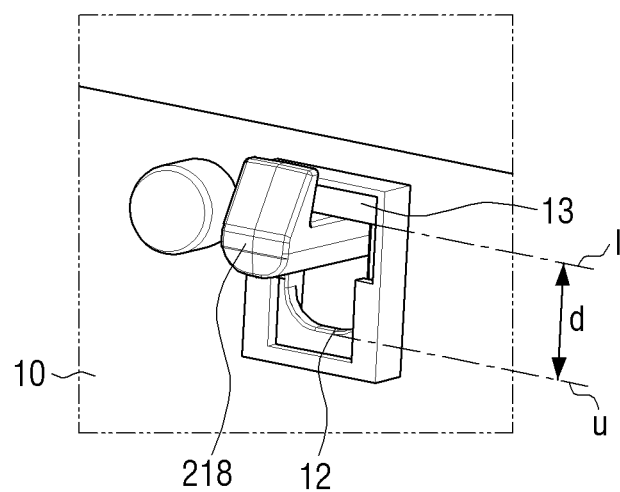
FIG. 5 is a perspective view illustrating a state in which a hook provided in the docking station of FIG. 1 is coupled to an electronic device.

FIG. 3 is a sectional view illustrating a state in which an electronic device is docked to the docking station 1 of FIG. 1, and FIG. 4 is an expanded sectional view illustrating a part of "A" in FIG. 3. FIG. 5 is a perspective view illustrating a state in which a hook 218 provided in the docking station 1 of FIG. 1 is coupled to an electronic device 10.

An electronic device 10 that will be described hereinafter may be one of various types of devices that are compatible with the docking station 1. For example, the electronic device 10 may be a variety of devices such as a laptop computer, a tablet computer, a smart phone, a personal digital assistant (PDA), etc. In the present embodiment, as illustrated in FIG. 3, a laptop computer is disclosed as an example of the electronic device 10.

Referring to FIG. 3, the electronic device 10 is mounted to the top surface 102 (FIG. 1) of the station body 100, thereby being docked to the docking station 1. At this time, the locking unit 200 is inserted into the hook member inserting hole 12 of the electronic device 10 so that the electronic device 10 is locked.

Referring to FIG. 4, the locking unit 200 further includes a locking elastic member 260 in addition to the hook member 210 and locking unit mounting portion 240 as described above.

The hook member 210 includes a hook body 212 and a hook 218.

The front end 214 of the hook body 212 projects toward the unlocking unit 400, and the rear end 216 thereof projects toward the lock maintaining unit 300. The locking elastic member 260 is inserted in the rear end 216 of the hook body 212.

The hook 218 is formed to project along the height direction (Z direction) of the station body 100 from the hook body 212. Referring to FIG. 5, when the hook 218 is coupled to the electronic device 10, the hook 218 is hooked on a hook catch protrusion 13 provided in the hook inserting hole 12 of the electronic device 10. The hook 218 can slide between the locking position "l" and the unlocking position "u." In other words, the hook 218 can slide within width "d" of the hook inserting hole 12 of the electronic device 10. Through the sliding, the electronic device 10 may be locked to or unlocked from the docking station 1.

The locking elastic member 260 is inserted in the rear end 216 of the hook body 212, and disposed inside the locking unit mounting unit 240. The locking elastic member 260 may be a coil spring, and thus provides the elastic force to the hook member 210 in the direction of the locking position "l" when the hook member 210 is slid toward the unlocking position "u."

Figure 6:
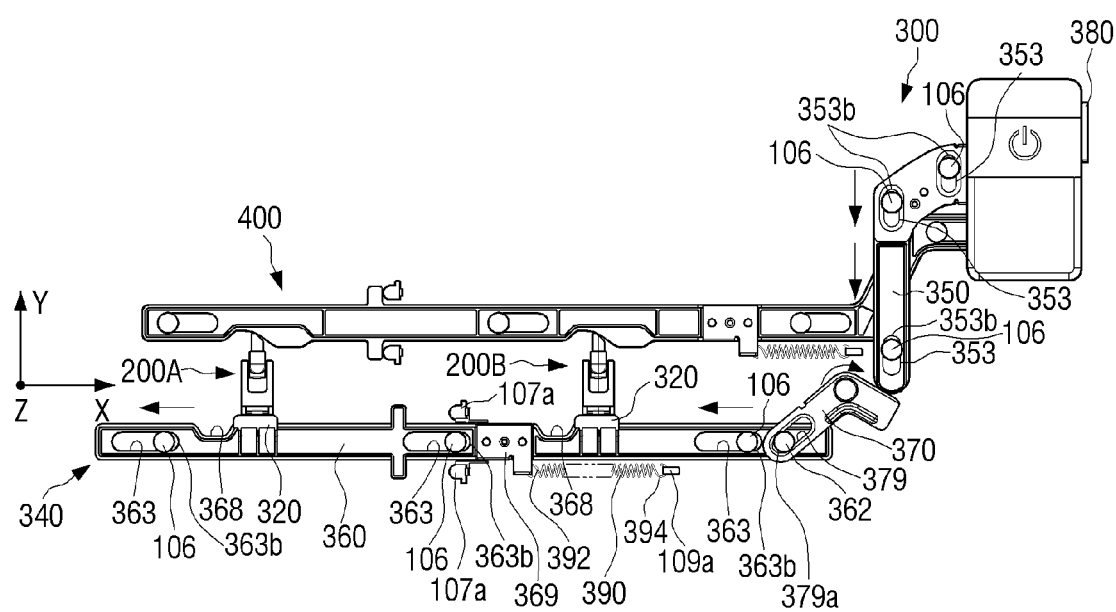
FIGS. 6 and 7 are operational views illustrating operation of a lock maintaining unit provided in the docking station of FIG. 1.
Figure 7:
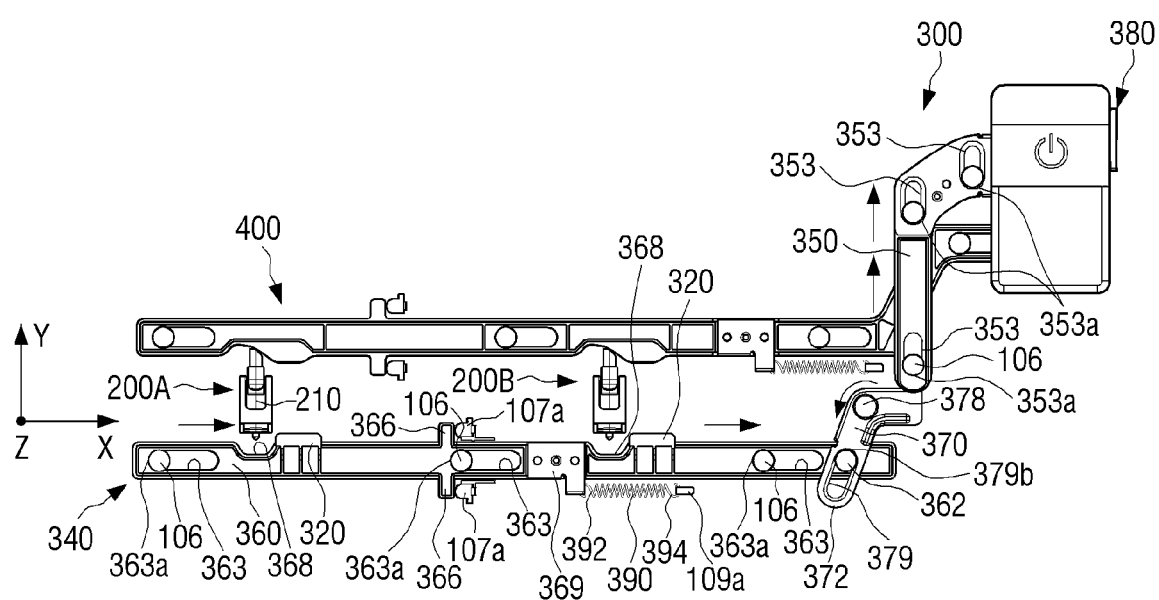

FIGS. 6 and 7 are operational views illustrating operation of a lock maintaining unit 300 provided in the docking station 1 of FIG. 1.

Referring to FIG. 6, if the user wants to retain the locking state of the electronic device 10 (see FIG. 3), the user inserts a key into the key hole 383 (see FIG. 1) of the stopper operation unit 380, and then rotates the key. The operation cam (not illustrated) of the stopper operation unit 380 is rotated in accordance with the rotation of the key, thereby sliding the first link member 350 in the forward direction (−Y direction). As the first link member 350 is slid, the sliding guide pins 106 inserted in the sliding guide holes 353 of the first link member 350 are relatively located in top portions 353b of the sliding guide holes 353.

Depending on the sliding of the forward direction (−Y direction) of the first link member 350, the third link member 370 is rotated in the clockwise direction. As the third link member 370 rotates in the clockwise direction, the connection pin 362 inserted in the rotation guide hole 379 of the third link member 370 is relatively placed in a bottom portion 379a of the rotation guide hole 379. Depending on the clockwise rotation of the third link member 370, the second link member 360 is slid in the first direction (−X direction). As the second link member 360 is slid, the sliding guide pins 106 inserted in the sliding guide holes 363 of the second link member 360 are relatively placed in right sides 363b of the sliding guide holes 363. As the second link member 360 is slid in the first direction (−X direction), each of the stoppers 320 is placed just behind each of the locking units 200A and 200B.

Referring to FIG. 7, if the user wants to release the locking state of the electronic device 10 (see FIG. 3), the user inserts the key into the key hole 383 (see FIG. 1) of the stopper operation unit 380, and then, rotates the key in a direction opposite to the rotation direction to maintain the locking state. Depending on the key rotation, the operation cam (not illustrated) of the stopper operation unit 380 is rotated in the direction opposite to the rotation direction to maintain the locking state.

As the operation cam (not illustrated) is rotated, the second link member 360 is slid in the second direction (+X direction). Depending on the sliding of the second link member 360, the sliding guide pins 106 inserted in the sliding guide holes 363 of the second link member 360 are relatively placed in left sides 363a of the sliding guide holes 363.

The driving force of the second link member 360 is provided by the elastic member 390. One end 392 of the elastic member 390 is mounted to the elastic member mounting unit 369 and the other end 394 thereof is mounted to an elastic member inserting portion 109a provided on the inner surface 104 (see FIG. 2) of the station body 100 (see FIG. 2). The elastic member 390 may be implemented, for example, as a coil spring. When the second link member 360 slides in the first direction (−X direction), the elastic member 390 is extended in the lengthwise direction of the second link member 360, and thus generates an elastic force to restore in the second direction (+X direction). After that, the elastic member 390 is restored to the original state by the rotation of the operation cam (not illustrated), thereby sliding the second link member 360 in the second direction (+X direction).

As the second link member 360 slides in the second direction (+X direction), each of the stoppers 320 is placed next to each of the locking units 200A and 200B, and the rear end receiving groove 368 to receive the rear end 216 (see FIG. 4) of the hook member 210 is placed behind each of the locking units 200A and 200B.

Sliding limiting protrusions 366 to limit the second link member 360 to slide over a predetermined distance in the second direction (+X direction) are formed in the second link member 360. The sliding limiting protrusions 366 are formed to project up and down from the second link member 360 in the width direction (Y direction) of the second link member 360. When the second link member 360 slides over a predetermined distance in the second direction (+X direction), the sliding limiting protrusion 366 is caught to a stopping protrusion 107a provided on the inner surface 104 (see FIG. 2) of the station body 100 (see FIG. 2), thereby stopping the sliding of the second link member 360.

As the second link member 360 slides in the second direction (+X direction), the third link member 370 is rotated in the counterclockwise direction. As the third link member 370 is rotated in the counterclockwise direction, the connection pin 362 inserted in the rotation guide hole 379 of the third link member 370 is relatively placed in the top side 379b of the rotation guide hole 379.

As the third link member 370 is rotated in the counterclockwise direction, the first link member 350 is slid in the reverse direction (+Y direction). As the first link member 350 is slid, the sliding guide pins 106 inserted in the sliding guide holes 353 of the first link member 350 are relatively placed in the bottom side 353a of the sliding guide holes 353.

After the movement of the stopper guide link unit 340 is completed, the rear end receiving groove 368 is placed behind each of the locking units 200A and 200B so that the hook member 210 of each of the locking units 200A and 200B is not limited to slide for unlocking.

Figure 8:
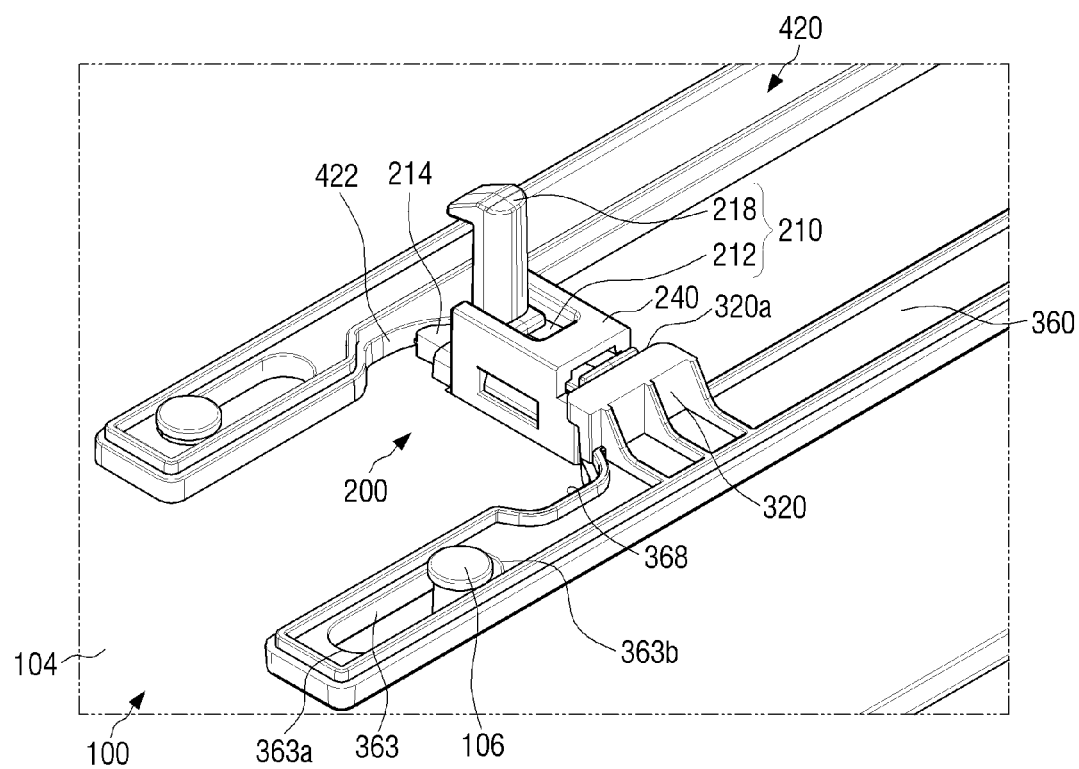
FIG. 8 is an expanded perspective view illustrating a stop position of a stopper provided in the lock maintaining unit of FIG. 6.

FIG. 8 is an expanded perspective view schematically illustrating a stop position of a stopper provided in the lock maintaining unit of FIG. 6.

Referring to FIG. 8, the stopper 320 is placed just behind the locking unit 200 in the stop position. A front surface 320a of the stopper 320 blocks the rear end 216 (see FIG. 9) of the hook body 212. The front end 214 of the hook body 212 is in contact with the front end receiving groove 422 of the unlocking guide link 420. Since opposite ends of the hook body 212 of the locking unit 200 are blocked by the stopper 320 and the front end receiving groove 422 respectively, the hook member 210 cannot be slid to the unlocking position "u" (see FIG. 4).

Accordingly, since the docking station 1 (see FIG. 1) continuously maintains the locking of the electronic device 10 (see FIG. 3), the electronic device 10 (see FIG. 3) may be prevented from being separated from the docking station 1 (see FIG. 1). As a result, the docking station 1 (see FIG. 1) may prevent unexpected accidents such as theft of the electronic device 10 (see FIG. 3).

Figure 9:
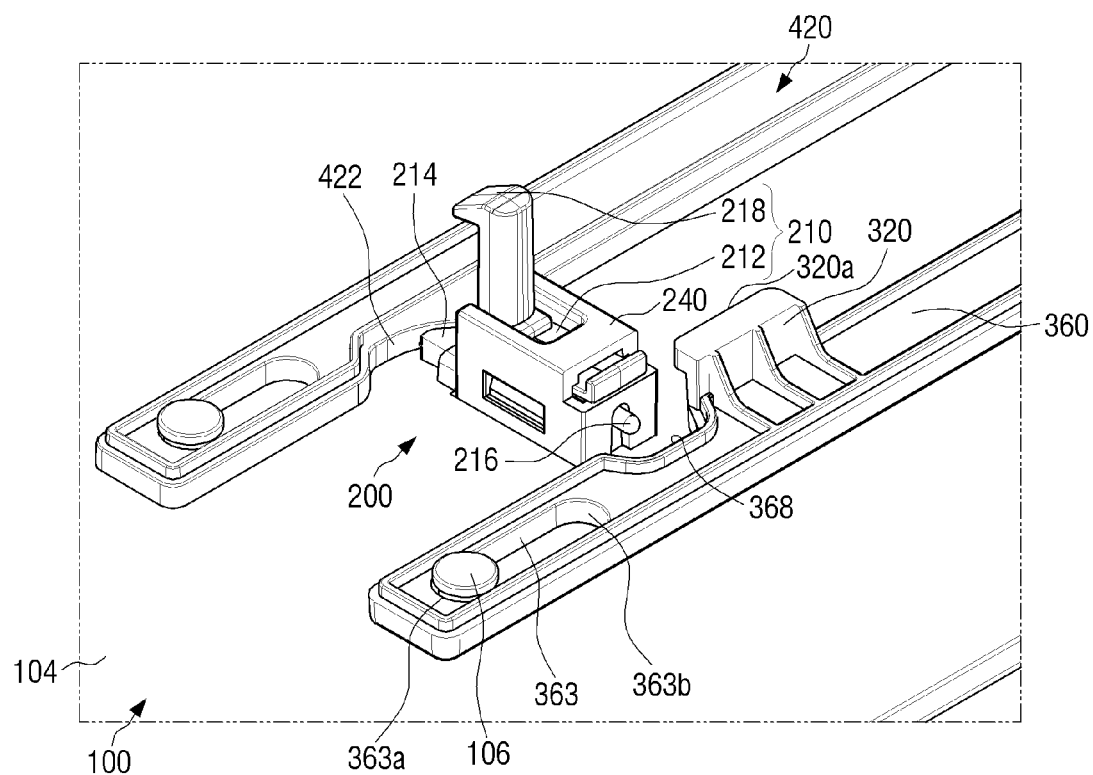
FIG. 9 is an expanded perspective view illustrating a stop release position of a stopper provided in the lock maintaining unit of FIG. 7.

FIG. 9 is an expanded perspective view schematically illustrating a stop release position of a stopper 320 provided in the lock maintaining unit 300 of FIG. 7.

Referring to FIG. 9, in the stop release position, the stopper 320 is spaced apart from the locking unit 200 and is placed in the right of the locking unit 200. Instead, the rear end receiving groove 368 is placed behind the locking unit 200. The rear end receiving groove 368 is placed to face the rear end 216 of the hook body 212, and thus forms a receiving space in which the rear end 216 of the hook body 212 can be received. The front end 214 of the hook body 212 is in contact with the front end receiving groove 422 of the unlocking guide link 420.

Accordingly, the hook member 210 of the locking unit 200 may be slid to a point of contact with the rear end receiving groove 368. As a result, since the docking station 1 (see FIG. 1) can release the locking of the electronic device 10 (see FIG. 3) as needed, the electronic device 10 (see FIG. 3) can be separated from the docking station 1 (see FIG. 1).

Figure 10:
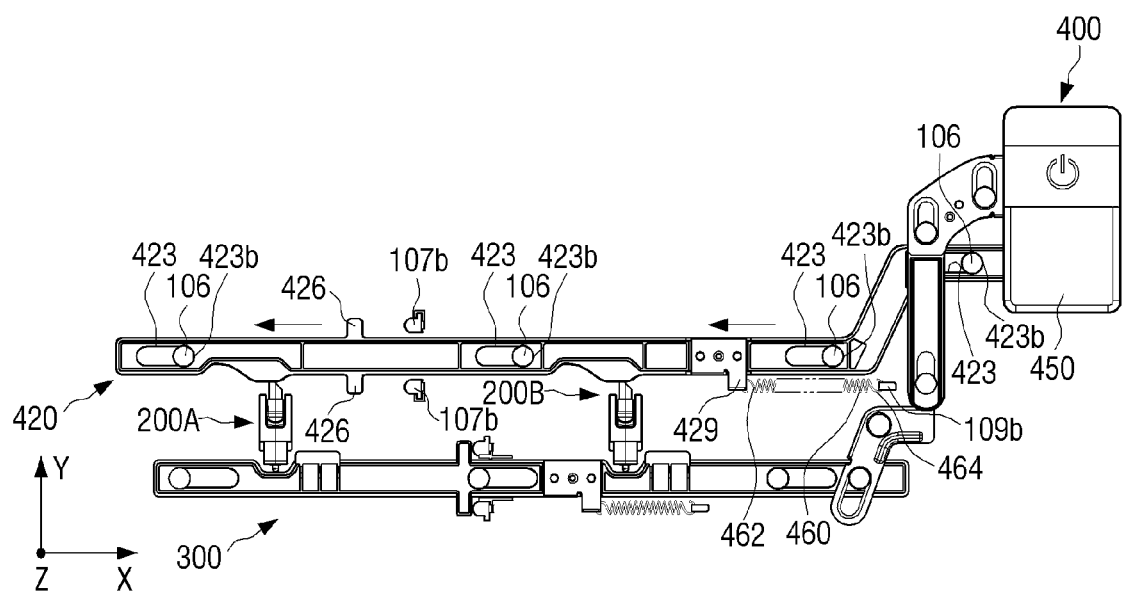
FIGS. 10 and 11 are operational views illustrating operation of an unlocking unit provided in the docking station of FIG. 1.
Figure 11:
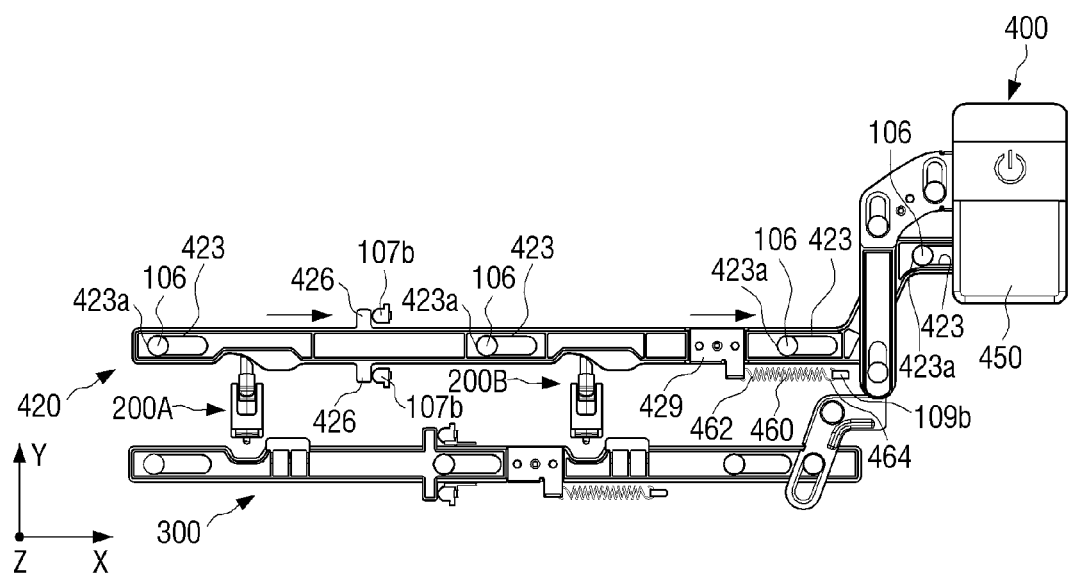

FIGS. 10 and 11 are operational views illustrating operation of an unlocking unit provided in the docking station 1 of FIG. 1.

Referring to FIG. 10, if the user wants to unlock an electronic device 10 (see FIG. 3) docked to the docking station 1 (see FIG. 1), the user first pressurizes the unlocking operation unit 450 of the unlocking unit 400. At this time, the lock maintaining state of the lock maintaining unit 300 is previously released, as illustrated in FIG. 9.

The unlocking operation cam (not illustrated) of the unlocking operation unit 450 is rotated by the user operation, thereby sliding the unlocking guide link 420 in the first direction (−X direction). As the unlocking guide link 420 is slid, the sliding guide pins 106 inserted in the sliding guide holes 423 of the unlocking guide link 420 are relatively placed in the right side 423*b* of the sliding guide holes 423.

As the unlocking guide link 420 is slid in the first direction (−X direction), the front end 214 (see FIG. 12) of the hook body 212 (see FIG. 12) of each of the locking units 200A and 200B is slid in the forward direction (−Y direction).

Figure 12:
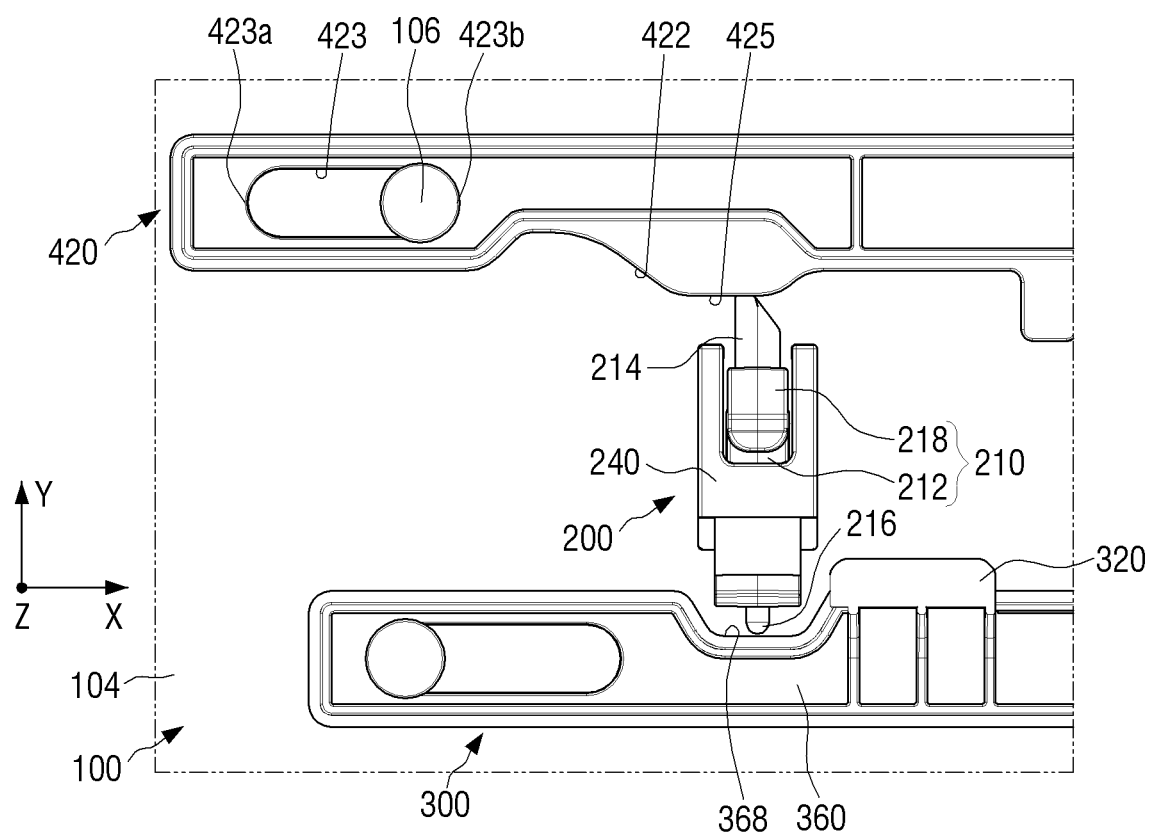
FIGS. 12 and 13 are expanded views illustrating major parts of the unlocking unit during operation of the unlocking unit of FIGS. 10 and 11.

The hook member 210 (see FIG. 4) of each of the locking units 200A and 200B is moved to the unlocking position "u" (see FIG. 4) by the sliding of the front end 214 (see FIG. 12) of the hook body 212 (see FIG. 12). As a result, the hooks 218 (see FIG. 4) of the locking units 200A and 200B are separated away from the hook catch projection 13 of the electronic device 10 (see FIG. 4) so that unlocking of the locking units 200A and 200B is made. Accordingly, the user can easily separate the electronic device 10 (see FIG. 4) from the docking station 1 (see FIG. 1). At the same time, when separating the electronic device 10 (see FIG. 4), the push button 130 may push up the electronic device 10 (see FIG. 3) in conjunction with the behavior of the unlocking unit 400, thereby making it easier for the separation of the electronic device 10 (see FIG. 4).

Referring to FIG. 11, if the user wants to release the unlocking state of the docking station 1 (see FIG. 1), the user again pressurizes the unlocking operation unit 450 of the unlocking unit 400. At this time, the lock maintaining state of the lock maintaining unit 300 is also previously released, as illustrated in FIG. 9.

The unlocking operation cam (not illustrated) of the unlocking operation unit 450 is rotated in the direction opposite to the rotation direction when unlocking, thereby sliding the unlocking guide link 420 in the second direction (+X direction). As the unlocking guide link 420 is slid, the sliding guide pins 106 inserted in the sliding guide holes 423 of the unlocking guide link 420 are relatively placed in the left sides 423*a* of the sliding guide holes 423.

The driving force of the unlocking guide link 420 in the second direction (+X direction) is provided by the unlocking elastic member 460. One end of the unlocking elastic member 460 is mounted to the unlocking elastic member mounting unit 429, and the other end 464 thereof is mounted to the unlocking elastic member inserting portion 109*b* provided on the inner surface 104 of the station body 100 (see FIG. 2). The unlocking elastic member 460 may be implemented, for example, as a coil spring. When the unlocking guide link 420 slides in the first direction (−X direction), the unlocking elastic member 460 is extended in the lengthwise direction of the unlocking guide link 420, and thus generates an elastic force to restore in the second direction (+X direction). After that, the unlocking elastic member 460 is restored to the original state by the rotation of the unlocking operation cam (not illustrated) of the unlocking operation unit 450, thereby sliding the unlocking guide link 420 in the second direction (+X direction).

Unlocking sliding limiting protrusions 426 to limit the unlocking guide link 420 to slide over a predetermined distance in the second direction (+X direction) are formed in the unlocking guide link 420. The unlocking sliding limiting protrusions 426 are formed to project forward and reverse from the unlocking guide link 420 in the width direction (Y direction) of the unlocking guide link 420. When the unlocking guide link 420 slides a predetermined distance in the second direction (+X direction), the unlocking sliding limiting protrusion 426 is caught by an unlocking stopping protrusion 107*b* provided on the inner surface 104 of the station body 100, thereby stopping the sliding of the second link member 360.

As the unlocking guide link 420 slides in the second direction (+X direction), the front end 214 (see FIG. 12) of the hook body 212 (see FIG. 12) of each of the locking units 200A and 200B is slid in the reverse direction (+Y direction), and thus comes in contact with the front end receiving groove 422 (see FIG. 13) of the unlocking guide link 420. Accordingly, the hooks 218 (see FIG. 4) of the locking units 200A and 200B are slid in the direction of the locking position "l" (see FIG. 4), thereby escaping from the unlocking position "u" (see FIG. 4).

Figure 13:
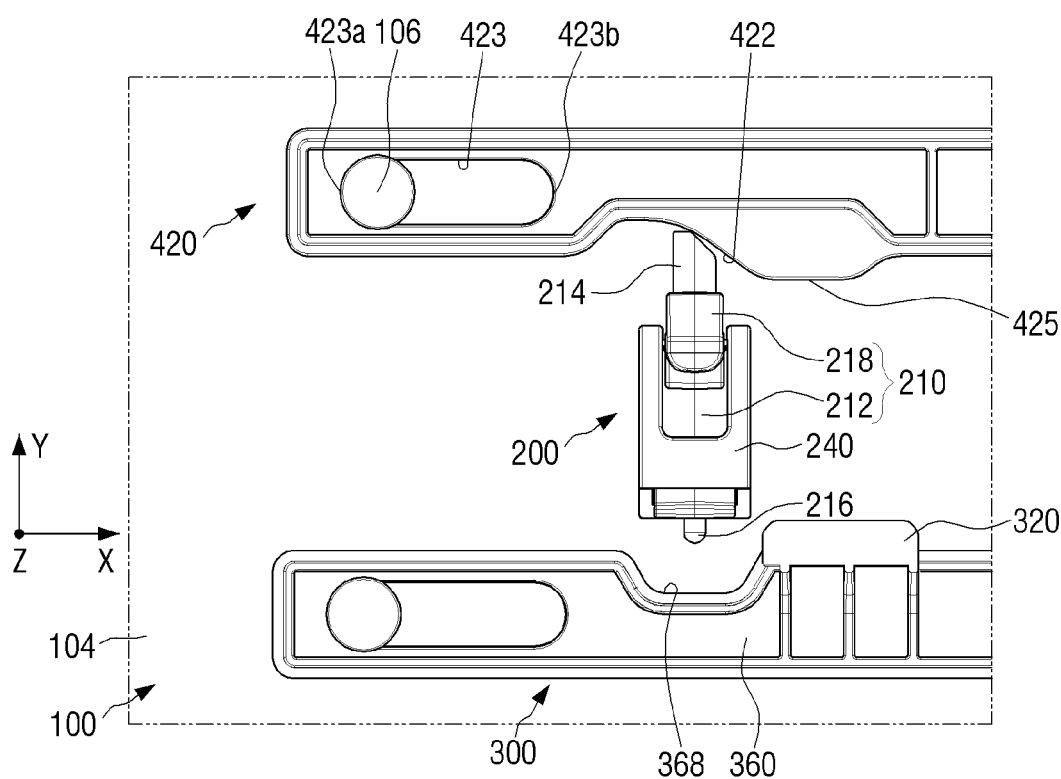

FIGS. 12 and 13 are expanded views schematically illustrating major parts of the unlocking unit 400 during operation of the unlocking unit 400 of FIGS. 10 and 11.

Referring to FIG. 12, after the unlocking of the locking unit 200 is completed, the front end 214 of the hook body 212 is in contact with a side surface 425 of the front end receiving groove 422 of the unlocking guide link 420, and the rear end 216 of the hook body 212 is in contact with the rear end receiving groove 368 of the second link member 360 of the lock maintaining unit 300. Here, the rear end 216 of the hook body 212 may be received in the rear end receiving groove 368 without contact with the rear end receiving groove 368.

Since the front end 214 of the hook body 212 of the locking unit 200 is moved a predetermined distance in the forward direction (−Y direction) from the locking position "l" (see FIG. 4), the hook 218 may also be placed away from the locking position "l" (see FIG. 4) to the unlocking position "u" (see FIG. 4) corresponding to the movement distance of the forward direction (−Y direction) of the hook body 212.

Referring to FIG. 13, after the unlocking of the locking unit 200 is turned off, the front end 214 of the hook body 212 is in contact with the front end receiving groove 422 of the unlocking guide link 420, and the rear end 216 of the hook body 212 is spaced apart a predetermined distance in the reverse direction (+Y direction) from the rear end receiving groove 368 of the second link member 360 of the lock maintaining unit 300.

Since the front end 214 of the hook body 212 of the locking unit 200 is moved a predetermined distance in the reverse direction (+Y direction) from the unlocking position "u" (see FIG. 4), the hook 218 may also be placed to the locking position "l" (see FIG. 4) away from the unlocking position "u" (see FIG. 4) corresponding to the movement distance of the reverse direction (+Y direction) of the hook body 212.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A docking station for an electronic device comprising:
    a station body to which the electronic device is detachably docked;
    at least one locking unit including a hook member to move between a first position in which the station body and the electronic device are connected and a second position in which the station body is separated from the electronic device; and
    a lock maintaining unit to prevent the hook member from being moved from the first position to the second position by an external force that is directly applied to the hook member when the hook member is positioned at the first position by the at least one locking unit; and an unlocking unit disposed parallel to the lock maintaining unit to move the hook member from the first position to the second position, wherein the at least one locking unit is disposed between the lock maintaining unit and the unlocking unit.

2. The docking station for an electronic device of claim 1, wherein the lock maintaining unit comprises at least one stopper to move between a stop position to restrict movement of the hook member placed in the first position and a stop release position to allow the hook member to be unlocked.

3. The docking station for an electronic device of claim 2, wherein the lock maintaining unit further comprises:
a stopper guide link unit to guide the stopper to the stop position or to the stop release position; and
a stopper operation unit to drive the stopper guide link unit depending on user operation.

4. The docking station for an electronic device of claim 3, wherein the stopper guide link unit comprises:
a first link member to move in a forward direction or in a reverse direction depending on operation of the stopper operation unit;
a second link member that moves in a first direction to guide the stopper to the stop position when the first link member moves in the forward direction, and moves in a second direction opposite to the first direction to guide the stopper to the stop release position when the first link member moves in the reverse direction; and
a third link member to transmit a driving force of the first link member to the second link member.

5. The docking station for an electronic device of claim 4, wherein:
the third link member transmits the driving force of the first link member to the second link member when the first link member moves in the forward direction; and
the lock maintaining unit further comprises an elastic member that is connected to the second link member, and provides an elastic force to the second link member in the second direction when the first link member moves in the reverse direction.

6. The docking station for an electronic device of claim 5, wherein:
the elastic member comprises a coil spring; and
the coil spring comprises one end to be connected to the second link member and the other end to be fixed to the station body.

7. The docking station for an electronic device of claim 4, wherein the third link member comprises:
one end link-connected to the second link member; and
another end positioned to movably contact with the first link member.

8. The docking station for an electronic device of claim 7, wherein the third link member is mounted to the station body through a pivot pin, and can rotate around the pivot pin.

9. The docking station for an electronic device of claim 7, wherein:
the third link member comprises a rotation guide hole to guide rotation of the third link member; and
the second link member comprises a connection pin to be inserted in the rotation guide hole.

10. The docking station for an electronic device of claim 4, wherein:
each of the first link member and the second link member comprises at least one sliding guide hole; and
the station body comprises at least one sliding guide pin to be inserted in the at least one sliding guide hole.

11. The docking station for an electronic device of claim 4, wherein:
the second link member comprises at least one sliding limiting protrusion; and
the station body comprises at least one catch projection to be in contact with the sliding limiting protrusion when the second link member moves in the second direction.

12. The docking station for an electronic device of claim 4, wherein the second link member comprises at least one rear end receiving groove to receive a rear end of the hook member when the hook member is placed in the second position.

13. The docking station for an electronic device of claim 4, wherein:
the stopper operation unit comprises an operation cam for the user operation; and
the stopper guide link unit is driven through rotation of the operation cam.

14. The docking station for an electronic device of claim 4, wherein the stopper is formed integrally with the second link member.

15. The docking station for an electronic device of claim 14, wherein the stopper is formed to project from the second link member in a height direction from the station body.

16. The docking station for an electronic device of claim 1, wherein the unlocking unit comprises:
an unlocking guide link to move in the first direction or in the second direction; and
an unlocking operation unit to drive the unlocking guide link depending on the user operation,
wherein when the unlocking guide link is moved in the first direction, the hook member is moved to the second position, and, when the unlocking guide link is moved in the second direction, the hook member is moved to the first position.

17. The docking station for an electronic device of claim 16, wherein:
the unlocking guide link is in contact with a front end of the hook member;
when being moved in the first direction the unlocking guide link moves the front end of the hook member in the forward direction; and,
when being moved in the second direction the unlocking guide link moves the front end of the hook in the reverse direction.

18. The docking station for an electronic device of claim 17, wherein the unlocking guide link comprises at least one front end receiving groove to receive the front end of the hook member when the hook member is placed in the first position.

19. The docking station for an electronic device of claim 16, wherein:
the unlocking guide link comprises at least one sliding guide hole; and
the station body comprises at least one sliding guide pin to be inserted in the at least one sliding guide hole.

* * * * *